US005768865A

United States Patent [19]
Rosenbalm et al.

[11] Patent Number: 5,768,865
[45] Date of Patent: Jun. 23, 1998

[54] HEADER EQUIPPED WITH ROTARY CUTTERBAR AND CROP CONVERGING STRUCTURE

[75] Inventors: Allan Wesley Rosenbalm, Blakesburg; Michael Joseph Verhulst, Ottumwa, both of Iowa; Duane Huppert, Ellensburg, Wash.

[73] Assignee: Deere & Company, Moline, Ill.

[21] Appl. No.: 818,518

[22] Filed: Mar. 14, 1997

Related U.S. Application Data

[63] Continuation-in-part of Ser. No. 690,133, Jul. 31, 1996, abandoned.

[51] Int. Cl.$^6$ ..................................................... A01D 34/82
[52] U.S. Cl. ............................... 56/6; 56/13.6; 56/16.4 R
[58] Field of Search ............................. 56/6, 13.5, 13.9, 56/15.1, 15.2, 15.3, 15.5, 15.6, 16.9 R, 17.3, 255, 295, 192, DIG. 1, DIG. 6, DIG. 9, DIG. 11, 10.2 H, 14.4, 14.6

[56] References Cited

U.S. PATENT DOCUMENTS

| | | | |
|---|---|---|---|
| 3,654,753 | 4/1972 | Gervais | 56/27.5 |
| 3,772,865 | 11/1973 | Ruprecht et al. | |
| 4,365,461 | 12/1982 | Schütt | 56/17.3 X |
| 4,972,662 | 11/1990 | Korthuis et al. | 56/10.2 |
| 5,343,675 | 9/1994 | Norton | 56/10.2 R |
| 5,421,145 | 6/1995 | Pruitt et al. | 56/6 |
| 5,430,997 | 7/1995 | O'Halloran et al. | 56/6 |
| 5,433,064 | 7/1995 | Schmitt et al. | 56/6 |
| 5,463,852 | 11/1995 | O'Halloran et al. | |

Primary Examiner—Michael J. Carone
Assistant Examiner—Robert Pezzurto

[57] ABSTRACT

A crop harvester header or platform includes a rotary cutterbar for cutting and directing crop to a crop conditioner having a length shorter than that of the cutterbar and being disposed centrally behind the cutterbar. The header is equipped with a crop converging structure including right- and left-hand drums or cages respectively mounted to the tops of right- and left-hand cutter discs respectively at opposite ends of the cutterbar, and further including right- and left-hand crop guiding or directing structures respectively disposed for guiding crop from forward locations of the drums or cages over the cutter discs respectively adjacent the end cutter discs and toward the crop conditioner. Right- and left-hand transverse wall or bulkhead structures extend upwardly from a transverse stiffener member at the rear of the cutterbar and air inlet openings are provided in each of the transverse walls in order that at least the endmost cutter discs are in communication with an adequate source of air permitting them to create an airstream for sufficient for aiding in conveying crop to the crop conditioner 13 Claims, 4 Drawing Sheets

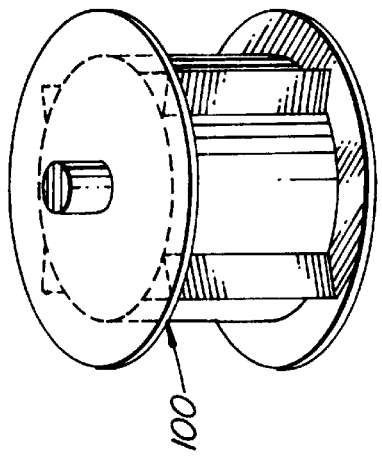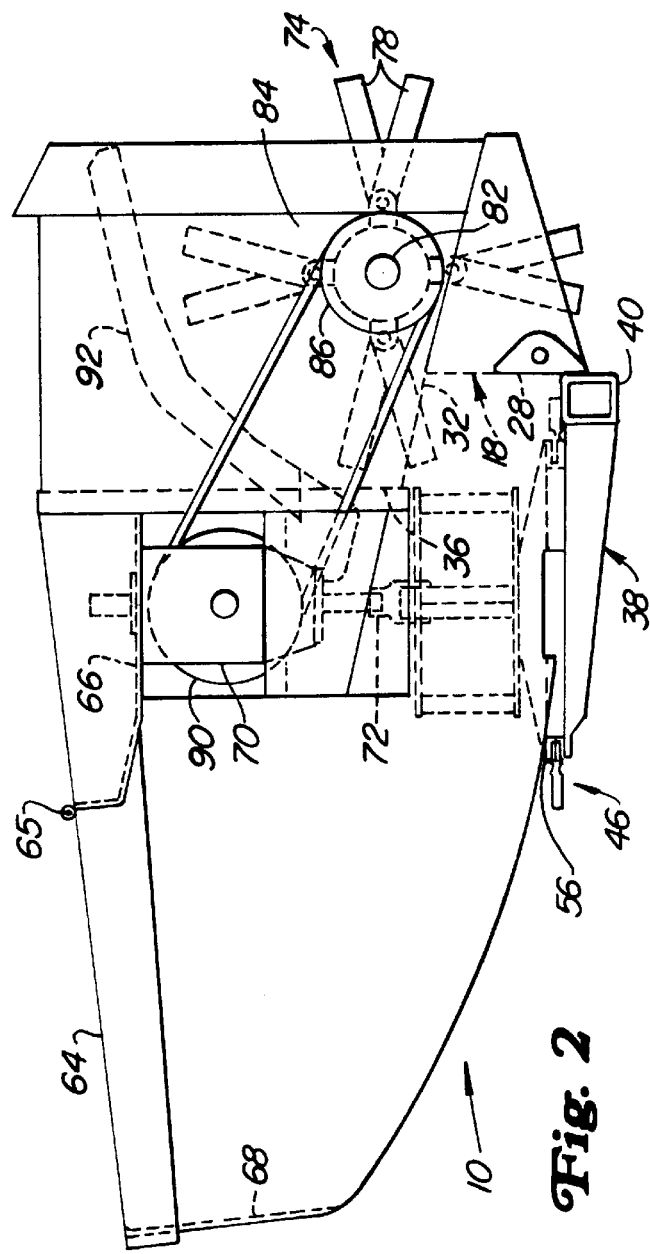

HEADER EQUIPPED WITH ROTARY CUTTERBAR AND CROP CONVERGING STRUCTURE

CROSS-REFERENCE TO RELATED APPLICATION

This is a continuation-in-part of application Ser. No. 08/690,133 filed 31 Jul, 1996, now abandoned.

BACKGROUND OF THE INVENTION

The present invention relates to crop harvester headers and more particularly relates to crop converging structures for headers equipped with a rotary cutterbar.

Conditioner width on large mower conditioners, those greater than 3.5 meters in width, has been limited by manufacturing problems associated with making long rotating conditioning elements. The tread width of the carrying unit, which may be either a self-propelled or center-pivot towed unit, for example, also limits the conditioner width. Thus, these machines require some sort of converging device between the cutterbar, which extends the full width of the machine, and the conditioner, which has a width somewhat less than that of the cutterbar. Sickle machines have used drapers or augers to do this. Rotary cutterbar machines have used rotating elements, such as cages or drums, located above opposite end sections of the cutterbar to aid in converging the crop. This type of convergence is disclosed in U.S. Pat. No. 5,463,852 issued to O'Halloran on 7 Nov. 1995, for example.

This patented structure is not entirely satisfactory since the crop cut by the cutter disc at each end of the cutterbar must travel sideways until it gets past the second disc from the end before being able to move into the crop passage containing the conditioner. In heavy crop, the sideways-travelling cut crop tends to push down uncut crop resulting in a poor quality of cut known as streaking. The sideways-travelling cut crop also may become recut which wastes power. Furthermore, the cut crop, under some conditions, tends to wrap on the rotating crop converging elements.

SUMMARY OF THE INVENTION

According to the present invention, there is provided a header or platform equipped with a rotary cutterbar and improved structure for converging the crop cut by discs at outer, opposite end sections of the cutterbar.

An object of the invention is to provide a header equipped with a rotary cutterbar and to mount a crop converging structure at each end section of the cutterbar for moving and directing or guiding cut crop inwardly from these cutterbar end sections in such a way that the cut crop does not interfere with the cutting of the uncut crop nor become recut or tend to wrap on rotating convergence elements.

A more specific object of the invention is to provide a header, as stated in the immediately preceding object, wherein the crop converging structure at each end section of the cutterbar includes a rotary drum or cage, mounted for rotation with the end disc, that operates in combination with a crop guidance or deflector structure for moving and guiding or deflecting cut crop sideways from the forward sides of the drums, across the cutting disc adjacent the end disc on which the drum or cage is carried and toward a crop conditioner mounted across a crop passage communicating with and extending rearwardly from a central section of the cutterbar.

Yet another object of the invention is to provide a header, as stated in the immediately preceding object, including at least one air inlet opening in the bulkhead behind each end cutting disc so as to help feed the cut crop from the end disc inwardly and rearwardly to the crop conditioner.

These and other objects will become apparent from a reading of the ensuing description together with the appended drawings.

BRIEF DESCRIPTION OF THE DRAWINGS

FIG. 2 is a left side elevational view of the header.

FIG. 3 is a perspective view of a rotary drum forming part of the crop convergence structure.

DESCRIPTION OF THE PREFERRED EMBODIMENT

Figure 1:
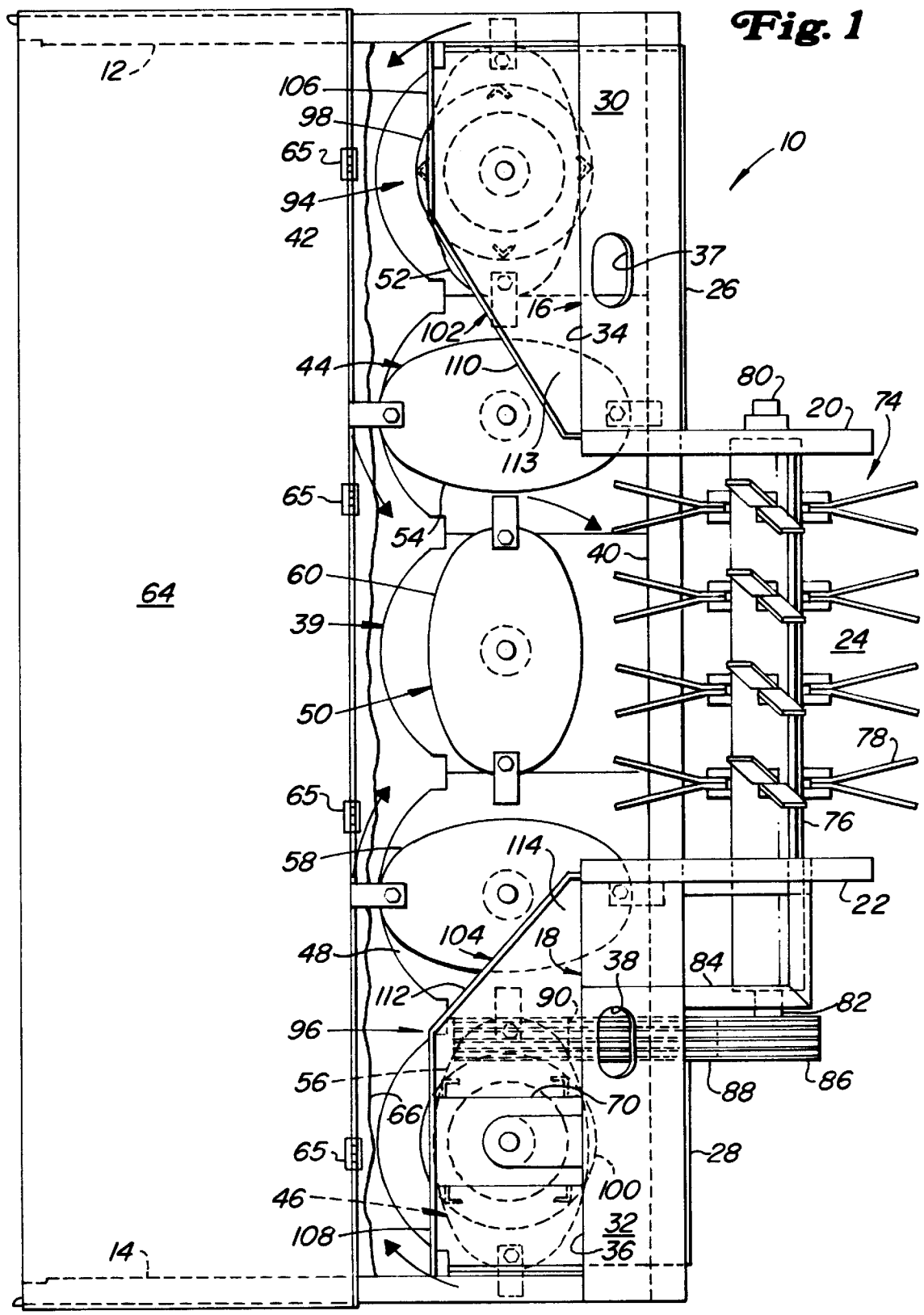
FIG. 1 is a somewhat schematic, top plan view of a header equipped with a rotary cutterbar, impeller conditioner and a crop convergence structure constructed in accordance with the present invention, but with the impeller conditioner hood and rotary cutterbar shield being removed exposing the cutterbar and crop conditioner.

Referring now to FIGS. 1 and 2, a part of a mower-conditioner header 10 is shown including a body defined by right- and left-hand sidewalls 12 and 14, respectively. Right- and left-hand upright transverse walls or bulkheads 16 and 18, respectively, extend inwardly from the sidewalls 12 and 14 and terminate at forward ends of right- and left-hand, fore-and-aft extending inner sidewalls 20 and 22 that define a crop passage 24 located centrally between the sidewalls 12 and 14. While the walls 16 and 18 could be of various upright configurations without departing from the principles of the present invention, they are here shown as including respective vertical lower sections 26 and 28, respective upwardly and forwardly angled middle sections 30 and 32, and respective upper vertical sections 34 and 36. Respectively located in the angled middle sections 30 and 32 of the bulkheads 16 and 18 are oval shaped air inlets 37 and 38, having a purpose explained below. Further, it will be appreciated from the function of the air inlets, set forth below, that inlets of different sizes or numbers may function acceptably.

An elongate rotary cutterbar 39 extends transversely between the sidewalls 12 and 14. Extending the length of and defining a rear portion of the cutterbar 38 is a tubular stiffener beam 40 of square cross section that is bolted to lower portions of the lower vertical sections 26 and 28, respectively of the transverse walls 16 and 18. While the present invention could be advantageously applied to rotary cutterbars of various constructions, the cutterbar 39 is a known type containing a plurality of intermeshed spur gears (not shown) including idler and drive gears coupled for effecting rotation of respective drive shafts of a plurality of cutting units spaced along the length of the cutterbar. For details of the cutterbar 39, reference may be made to U.S. Pat. No. 5,012,635 issued to Walters et al. on 7 May 1991, which is incorporated herein in its entirety by reference.

The cutting units are defined by a right-hand pair including a right-hand end cutting unit 42 and a right-hand inner cutting unit 44, by a left-hand pair including a left-hand end cutting unit 46 and a left-hand inner cutting unit 48, and a single center cutting unit 50. The cutting units 42, 44, 46, 48 and 50 respectively include cutter discs 52, 54, 56, 58 and 60. The inner sidewalls 20 and 22 are respectively spaced inwardly from the opposite sides of the header 10 just slightly more than the axes of rotation of the cutter discs of the cutting units 44 and 48. A different relationship between these cutter discs and the sidewalls would be required for cutterbars having more than five cutting units, but the resulting structure would not depart from the principles of the invention.

As shown in FIG. 2, a shield including a panel 64, which is rectangular in top plan view, extends transversely between the sidewalls 12 and 14 and forwardly from a hinge joint 65 connecting the panel to a frame member 66, extending transversely between the sidewalls 12 and 14, at an upper location of the header 10 spaced vertically above a forward portion of the cutter bar 38. The shield 62 further includes a rectangular sheet of flexible material 68 fixed to a forward end of the panel 64 so that it extends downwardly from the panel when the shield is in its working position illustrated in FIG. 2.

A main power distributing gear box 70 is mounted directly above the cutter disc 56 of the left-hand end cutting unit 46 and includes a downwardly extending output shaft coupled, as by a shaft coupler 72 embodying a pair of u-joints, to a drive shaft (not shown) of the cutter disc 56. The gearing contained in the gear box 70 and cutterbar 38 is arranged such that, as viewed from above in FIG. 1, the left-hand pair of cutter discs 56 and 58, are both rotated in a clockwise direction while the right-hand pair of cutter discs 52 and 54 are both rotated in a counterclockwise direction, the respective directions being indicated by arrows. The center cutting disc 60 is here shown as also rotating in the clockwise direction, but could just as well rotate counterclockwise without affecting the present invention. In any event, the particular directions of rotation tend to move cut crop toward the crop passage 24. Mounted across the crop passage 24 for conditioning crop delivered to the passage is an impeller conditioner 74 including a tube 76 carrying a plurality of pivotably mounted flail knives 78 and having a right-hand end terminating adjacent an inner surface of the right-hand inner sidewall 20 and having a left-hand end portion extending through, and a short distance leftwardly beyond, the left-hand inner sidewall 22. Coaxial right- and left-hand shafts 80 and 82, respectively extend from the opposite ends of the tube 76 and are journalled in bearings (not shown) fixed to the sidewall 20 and to a support wall 84 spaced leftwardly from and extending parallel to the left-hand inner sidewall 22. A multiple groove v-belt pulley 86 is mounted to the shaft 82 and is coupled, as by a plurality of v-belts 88, to a multiple groove v-belt pulley 90 mounted to an output shaft extending rightwardly from the gear box 70. As can be seen in FIG. 2, a hood 92 extends over and adjacent a cylindrical path traced by outer ends of the knives 78 so as to cooperate with the knives in conditioning crop carried by the knives.

The movement of crop to the crop passage 24 and, hence, to the conditioner 74 is enhanced by right- and left-hand convergence structures 94 and 96, respectively, including ribbed drums 98 and 100, respectively, fixed to tops of the right- and left-hand end cutting unit discs 52 and 56 in concentric relationship to respective axes of rotation of the discs 52 and 56, and including right- and left-hand crop guide structures 102 and 104, respectively. In the case of the drum 100 fixed to the left-hand end cutter disc 56, the drum serves also as a shield for preventing crop from wrapping about the shaft assembly extending between the gear box 70 and the cutter disc 56. It is noted that in lieu of the drums 98 and 100, cage structures, each defined by ribs extending vertically between upper and lower cylindrical discs, could be used. Preferably, the respective radii of the drums 98 and 100 are such that outer peripheries of the drums sweep respective paths that are tangent to axially upward extensions of the paths traced by the outer ends of the cutting blades carried by the cutter discs 54 and 58, respectively, of the right- and left-hand inner cutter discs 44 and 48. It has been found that a drum radius of at least this size results in crop movement superior to that achieved by prior art drums which typically have a smaller radius.

Figure 4:
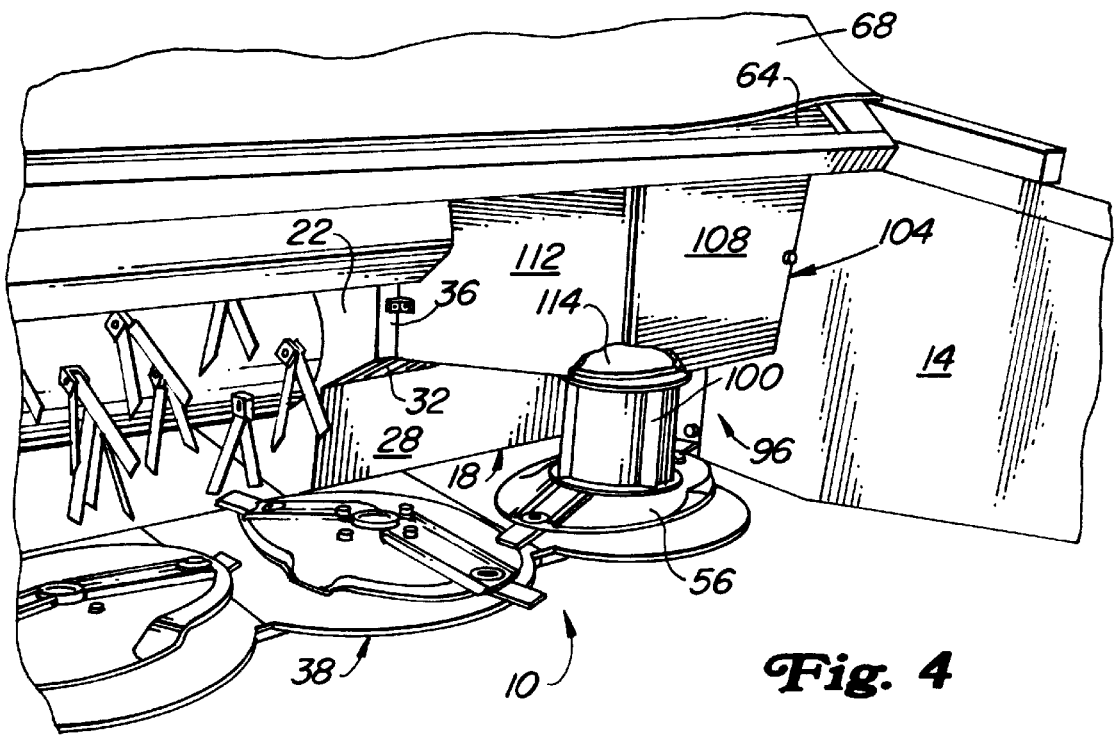
FIG. 4 is a perspective view looking towards crop converging structure at the front, left side portion of the header.
Figure 5:
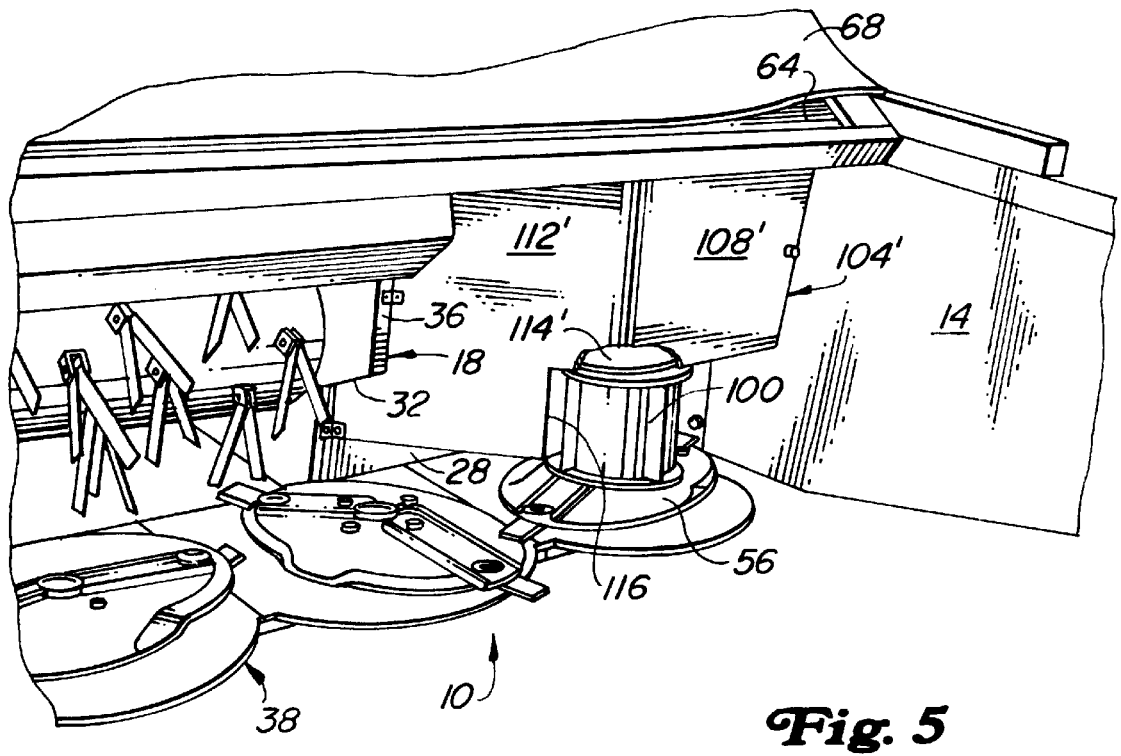
FIG. 5 is a view like that of FIG. 4 but showing a second deflector shield embodiment forming part of the converging structure.

Referring now also to FIG. 4, it can be seen that the guide structures 102 and 104 are respectively defined by angular vertical panels including respective transverse panel sections 106 and 108 disposed at right angles to the sidewalls 16 and 18 and being joined to rearwardly and inwardly extending panel sections 110 and 112 that are here shown as terminating adjacent forward ends of the inner sidewalls 20 and 22. An inward end of the transverse panel section 106 joins the panel section 110 to form a corner which lies along an imaginary surface of an upward projection of the drum 100. However, in order that the panel section 112 will clear the area occupied by the v-belt pulley 90, the transverse panel section 108 is made longer than the panel section 106. It will be appreciated then that the panel section 112 also serves to keep crop away from the pulley 94. It is here noted that improved crop flow has been achieved by angling the panel sections 110 and 112 such that they intersect the transverse walls or bulkheads 16 and 18 at respective locations thereof at least as far inwardly as the cutting path traced by the knives of the cutting discs 52 and 56, respectively of the right- and left-hand end cutting units 42 and 44. The transverse panel sections 106 and 108 have respective lower edges which extend horizontally above and in close to the tops of forward portions of the drums 98 and 100. In the case of the embodiment of the panel shown in FIG. 4, the lower edges of the rearwardly and inwardly extending panel sections 110 and 112 continue at the same height as the transverse sections 106 and 108 and are respectively joined to horizontal walls 113 and 114 which prevent crop material from collecting in the zone above the drums 98 and 100. However, with reference to FIG. 5, there is shown a guide structure 104' which is a variation of the guide structure 104 and differs therefrom in that a rearwardly and inwardly extending panel section 112' thereof has a lower edge which is stepped downwardly, as at edge 116, at the periphery of the drum 100 and then continues at a level approximately that of the bottom of the drum to the point where the panel section 112' meets the transverse wall 18. In this case a horizontal wall 114', disposed above the drum 100 at the same level as the previously described horizontal wall 114, abuts the panel section 112'. The panel section 112' is thus adapted for stripping crop from the drum 100 so as to keep it from being carried about by the drum 100 and recut. The lower edge of the panel section 112' also serves to strip crop tending to be carried forward by the discs rotating beneath the panel section.

In order to further aid in the flow of crop from the right- and left-hand end discs 52 and 56, the air inlet holes 37 and 38 are positioned for permitting air to be drawn in at locations respectively rearwardly of the inner ends of the discs 52 and 56. This drawn in air allows the discs 52 and 56 to create an air flow which assists the movement of cut crop inwardly towards the crop conditioner.

Figure 6:
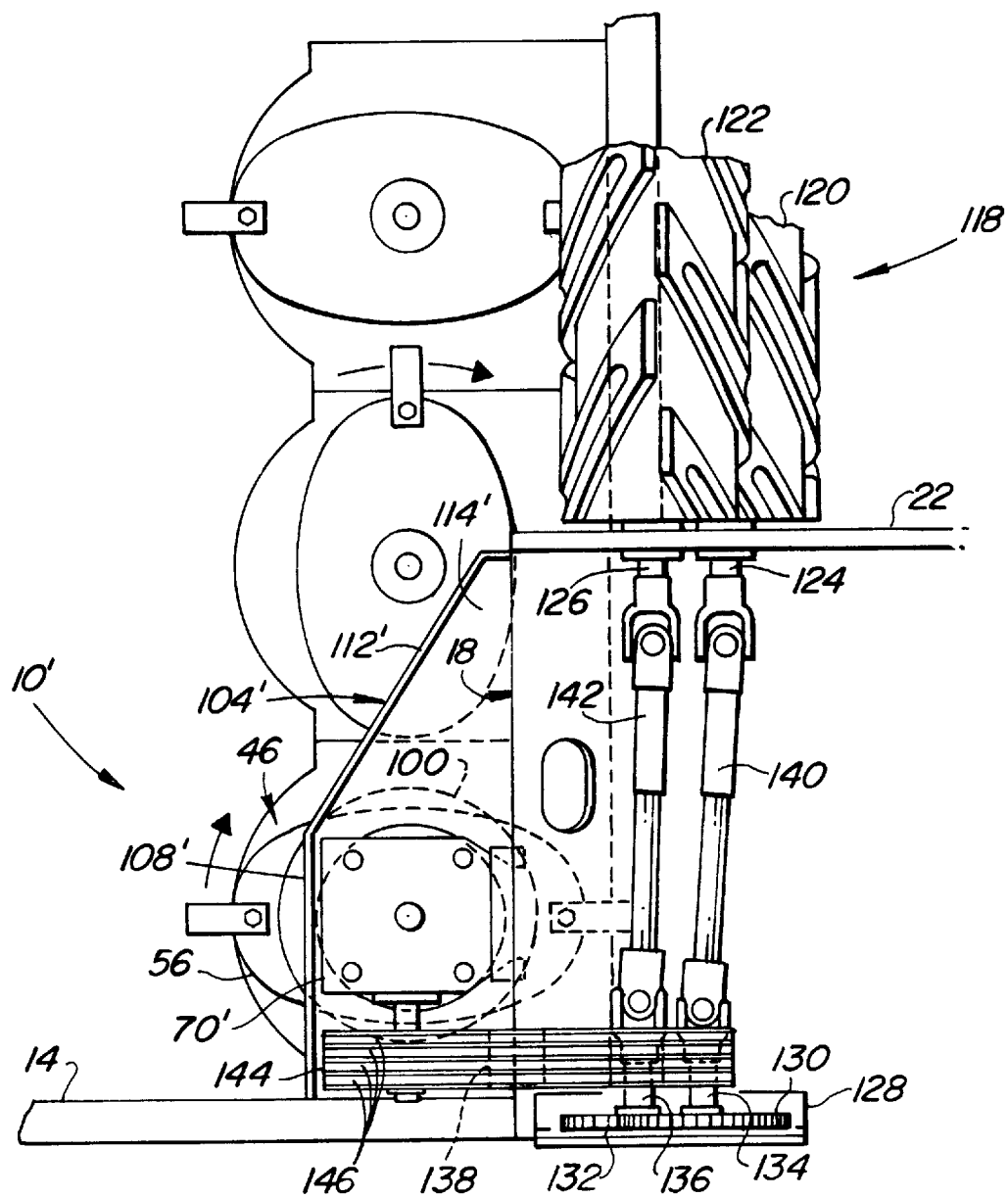
FIG. 6 is a top view of a left-hand end portion of a header equipped with conditioner rolls.

Referring now to FIG. 6, there is shown a left-hand portion of a header 10' which is similar to the header 10, but instead of being equipped with a rotary impeller conditioner, its is equipped with a roll conditioner 118 including lower and upper rolls 120 and 122, respectively, extending between the inner sidewalls 20 and 22, with the lower roll 120 including a central shaft 124 having its opposite ends rotatably mounted in bearings (not shown) fixed to the sidewalls 20 and 22 and with the upper roll 122 including a central shaft 126 having its opposite ends rotatably mounted in respective bearings carried by right- and left-hand arms (not shown) that are pivotally mounted, in a manner well known in the art, so that the upper roll 122 may move toward and away from the lower roll 120 in response to crop passing between the rolls during operation. A roll conditioner drive gear box 128 is mounted to an inner surface of the left-hand sidewall 14 and contains intermeshed lower and upper spur gears 130 and 132, respectively, mounted to lower and upper drive shafts 134 and 136, with the a multiple groove v-belt pulley 138 being mounted on a rightward extension of the upper drive shaft 136. The lower drive shaft 134 is connected to a left-hand end of the lower roll shaft 124 by a power shaft 140, and the upper drive shaft 136 is connected to a left-hand end of the upper roll shaft 122 by a power shaft 142. Power for driving the pulley 138 and, hence, the conditioner rolls 120 and 122 comes from a main power distributing gear box 70' mounted directly above the cutter disc 56 of the left-hand cutting unit 46. The gear box 70' contains a downwardly projecting output shaft which is connected to a drive shaft of the cutting unit 46 by a shaft coupler (not shown). Projecting leftwardly from the gear box 70' is another output shaft to which is mounted a multiple groove v-belt pulley 144, the latter being connected, as by a plurality of v-belts 146, to the v-belt pulley 138. The gearing (not shown) contained in the gear box 70' is arranged so that, as viewed looking towards the left-hand end of the header 10', the pulleys 138 and 144, and hence the upper conditioner roll 122, are driven counterclockwise resulting in the lower conditioner roll 120 being driven clockwise.

The structure for guiding cut crop to the conditioner rolls 120 and 122 is the same as, or basically the same as, that described above for guiding cut crop to the rotary impeller conditioner 74 with like reference numerals being applied to elements of the guidance structure that are identical to that already described. Specifically, there is provided a right-hand guide structure 102 (shown in FIG. 1) and a left-hand guide structure 104', the latter being the mirror image of the structure 102 in contrast to the previously described structure 104. The structure 104' can be made in this manner since the v-belt pulley 144 is located leftwardly of the gear box 70' and does not present an obstacle to an upright, angular guide panel including a transverse panel section 108' that extends between the left-hand sidewall 14 and joins a rearwardly and inwardly angled section 112' along a line which intersects an imaginary upward extension of the cylindrical path traced by an outer periphery of the left-hand drum 100. Like the previously described transverse panel section 106, a bottom edge of the panel section 106' extends above and in close proximity to a forward top portion of the drum 100 and the panel section 112' extends downwardly adjacent the drum 100 and has a bottom edge of the panel section 112' continues, at the same height as the bottom edge of the section 106', over the left-hand inner cutter disc 58 and to the transverse wall 18 adjacent its intersection with the left-hand inner sidewall 22.

In operation of either the header 10 or the header 10' in mowing a standing crop, the cutter discs 52 through 60 will be driven such that their respective cutter knives slice through stems of the crop. Due to the counterclockwise rotation of the right-hand pair of cutter discs 52 and 54, these discs will tend to move cut crop leftwardly toward the crop passage 24 while clockwise rotation of the left-hand pair of cutter discs 56 and 58 will result in these discs tending to move crop rightwardly toward the crop passage 24. This leftward and rightward movement of the cut crop is respectively aided by the right- and left-hand convergence structures 94 and 96, respectively, comprising the right- and left-hand drums 98 and 100 and by the right- and left-hand crop guide structures 102 and 104, or 102 and 104'. For example, crop cut by the left-hand end disc 56 will be engaged by the drum 100 and moved rightwardly with crop first sliding transversely along the panel section 108 and then rearwardly and inwardly along the panel section 112 or 112'. The combined action of the rotating discs 56 and 58, the air inlet 38, the drum 100 and the guide structure 104 or 104' results in the cut crop being moved in a continuous stream toward the passage 24 which has the benefit of the crop not bunching so as to push down uncut crop nor to be recut. Once the crop enters the passage 24 it is immediately engaged and propelled rearwardly by the rotary impeller conditioner 74 or roll conditioner 118. Operation at the right-hand end of the cutterbar 38 and of the header 10' is similar and is not described for the sake of brevity.

We claim:

1. In a crop harvesting header including a rotary cutterbar extending between a pair of transversely spaced, right- and left-hand outer sidewalls of the header and including a plurality of cutter discs, which, as viewed by a person standing behind and looking down on the cutterbar, includes right-hand outer and adjacent cutter discs being driven counterclockwise, and left-hand outer and adjacent cutter discs being driven clockwise so as to deliver crop towards a central zone of the header, a crop passage defined by right- and left-hand transversely spaced inner sidewalls extending rearwardly at opposite sides of said central zone, a right-hand upright bulkhead extending between said right-hand outer and inner sidewalls, a left-hand upright bulkhead extending between said left-hand outer and inner sidewalls, a crop conditioner positioned across said crop passage for engaging and conditioning crop entering said crop passage, and right- and left-hand cut crop convergence structures including right and left-hand rotary elements respectively mounted for rotation with said right- and left-hand outer cutter discs for assisting movement of crop cut at opposite sides of said central zone to said central zone, the improvement comprising: said right- and left-hand crop convergence structures respectively including right- and left-hand stationary crop guide structures respectively mounted in the vicinity of said right-and left-hand rotary elements and including right- and left-hand upright crop engaging surfaces oriented for directing cut crop from forward locations respectively of said right- and left-hand rotary elements across said right- and left-hand adjacent cutter discs.

2. The crop harvesting header defined in claim 1 wherein said crop engaging surfaces of said right- and left-hand crop guide structures are respectively defined by right- and left-hand first sections, and right- and left-hand second sections; said right- and left-hand first sections respectively extending transversely from said right- and left-hand outer sidewalls above respective forward portions of said right- and left-hand rotary elements, and said right- and left-hand second sections being angled rearwardly and inwardly respectively from said right- and left-hand first sections along respective paths extending above said right-and left-hand adjacent cutter discs.

3. The crop harvesting header defined in claim 2 wherein said right- and left-hand second sections of said crop guide structures have respective rear ends which terminate at forward ends of said right- and left-hand crop passage walls.

4. The crop harvesting header defined in claim 1 wherein said crop conditioner is an impeller conditioner; and said rotary crop converging elements each having a height approximately equal to a radius of said impeller conditioner.

5. The crop harvesting header defined in claim 1 wherein said crop conditioner is a roll conditioner including upper and lower conditioner rolls extending across said crop passage and defining a nip through which crop passes to be conditioned; and said rotary crop converging elements are each at a height approximately equal to that of said nip.

6. The crop harvesting header defined in claim 1 wherein said crop guide structures each include a bottom wall for preventing cut crop from entering a space located behind said crop engaging surfaces.

7. The crop harvesting header defined in claim 1 wherein said right- and left-hand bulkheads each include an air inlet located so as to permit air to be drawn in by said right- and left-hand outer cutter discs, whereby these cutter discs act to create an airstream which enhances crop flow to said crop conditioner.

8. The crop harvesting header defined in claim 6 wherein each bulkhead has a lower substantially vertical portion located rearwardly of said cutter discs, a middle portion inclined upwardly and forwardly from the lower portion, and a substantially vertical upper portion located just slightly behind said rotary crop converging elements; and each bulkhead having an air inlet located in said middle portion at an elevation below said bottom wall.

9. In a crop harvesting header including, as viewed from behind looking in a forward direction of travel, right- and left-hand, transversely spaced sidewalls, right- and left-hand transverse upright walls respectively being joined to and extending inwardly from said right- and left-hand sidewalls, said right- and left-hand transverse walls respectively having inner ends joined to respective forward ends of transversely spaced, fore-and-aft extending right- and left-hand crop passage walls defining a crop passage therebetween, a rotary cutterbar extending transversely between and having opposite rear side portions fixed to respective lower locations of said right- and left-hand transverse upright walls, said cutterbar having a plurality of cutter discs spaced therealong, and right- and left-hand crop convergence structures respectively associated with right- and left-hand end sections of said cutterbar for aiding in converging crop towards said crop passage, the improvement comprising: said crop converging structure including right- and left-hand rotary crop converging members respectively mounted to right- and left-hand end cutter discs of said plurality of cutter discs; said right- and left-hand crop convergence structures respectively including right- and left-hand upright crop directing surfaces, with said right-hand crop directing surface being defined by a right-hand transverse section and right-hand rearwardly and inwardly extending section, and with said left-hand crop directing surface being defined by a left-hand transverse section and a left-hand rearwardly and inwardly extending section; said right- and left-hand transverse sections respectively extending from said right- and left-hand sidewalls above and in close spaced relationship to forward top portions of said right- and left-hand rotary converging members, and said right- and left-hand rearwardly and inwardly extending sections respectively extending toward said crop passage and in vertically spaced relationship to tops of right- and left-hand cutter discs that are respectively adjacent said right- and left-hand end cutter discs.

10. The crop harvesting header defined in claim 9 wherein said rotary converging members are defined by respective drums mounted to said rightmost and leftmost cutter discs.

11. The crop harvesting header defined in claim 9 wherein said inwardly and rearwardly extending sections of said crop directing surfaces respectively terminate at forward ends of said right- and left-hand crop passage walls.

12. The crop harvesting header defined in claim 9 wherein said right- and left-hand crop deflecting structures respectively include right- and left-hand bottom walls respectively extending from said right- and left-hand transverse walls to said right-hand transverse and rearwardly and inwardly extending sections of said right-hand crop deflecting structure, and from said left-hand transverse wall to said left-hand transverse and said inwardly and rearwardly extending sections of said left-hand crop deflecting structure, whereby cut crop is prevented from accumulating behind said transverse and rearwardly and inwardly extending sections of said crop deflecting structures.

13. The crop harvesting header defined in claim 9 wherein said right- and left-hand transverse walls each contain at least one air inlet located in the vicinity of said rightmost and leftmost cutter discs, whereby the cutter discs will draw air in through said inlets to thereby enhance the formation of respective streams of air for carrying cut crop to said conditioner.

* * * * *